Jan. 1, 1924. 1,479,078
V. KRIEGERBECK ET AL
AUTOMATIC CINEMATOGRAPH
Filed Jan. 14, 1922 2 Sheets-Sheet 2

Inventors
V. Kriegerbeck
By Attorneys J. Bautz
Marks Clerk

Patented Jan. 1, 1924.

1,479,078

UNITED STATES PATENT OFFICE.

VACLAV KRIEGERBECK AND JINDŘICH BAUTZ, OF PRAGUE, CZECHOSLOVAKIA.

AUTOMATIC CINEMATOGRAPH.

Application filed January 14, 1922. Serial No. 529,347.

*To all whom it may concern:*

Be it known that we, VÁCLAV KRIEGERBECK and JINDŘICH BAUTZ, citizens of Czechoslovakia, and residing at Prague, Czechoslovakia, have invented certain new and useful Improvements in and Relating to Automatic Cinematographs, of which the following is a specification.

The invention relates to an automatic cinematograph consisting of two stable kinematographic apparatus of a known kind, which are so arranged that, while the projection is taking place in one of the apparatus, the film is wound up in the reverse direction in the other apparatus, the whole apparatus being capable of being put in operation only after a coin has been inserted. The object of the arrangement is to make it possible for any totally unskilled observer to manipulate the apparatus, for which purpose the apparatus is provided with arrangements adapted to prevent damage being done to the film and to force the observer to exhibit the film during a quite definite period of time, whereby time and lighting energy are saved.

Figure 1:
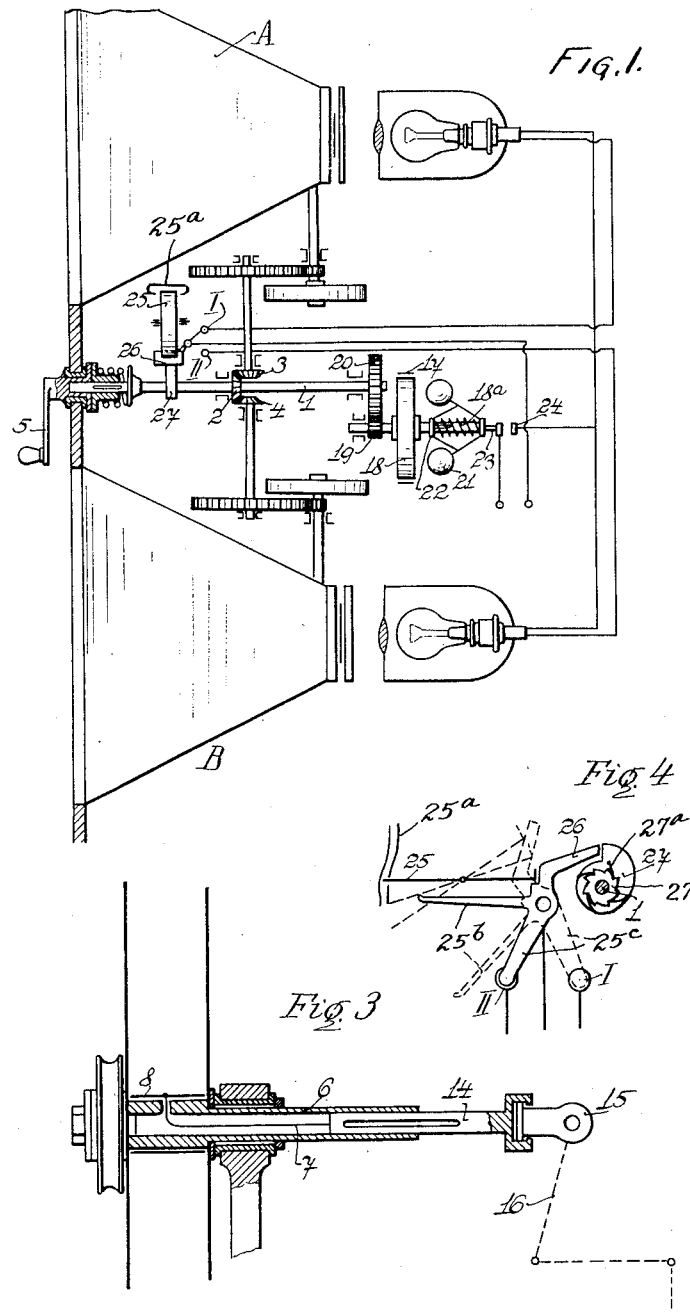
Figure 2:
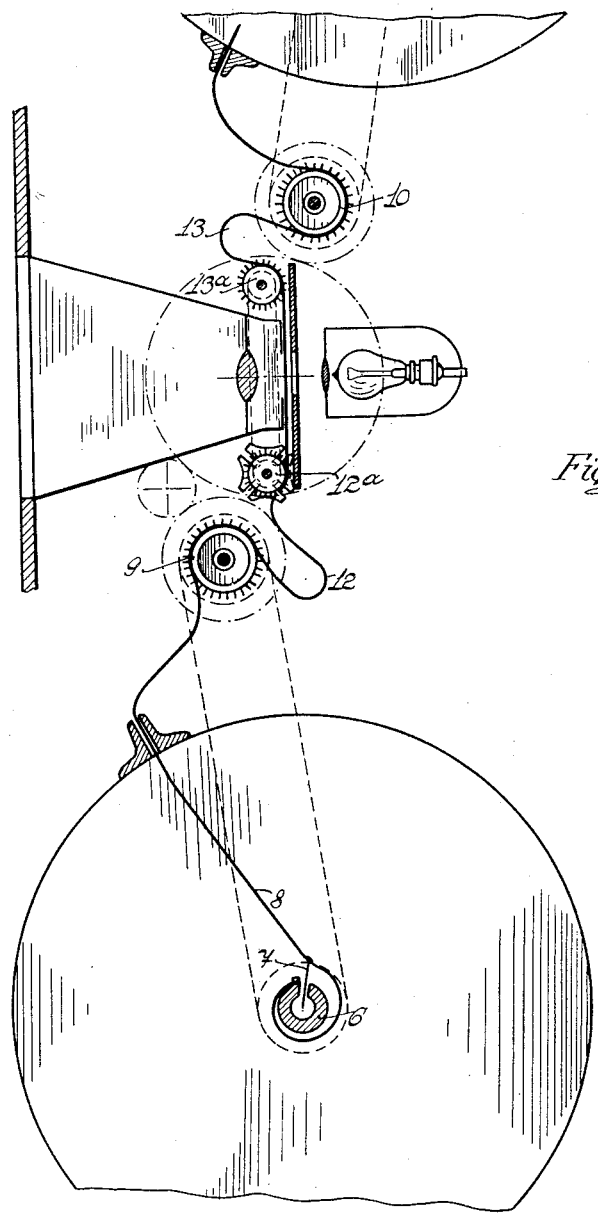

The automatic cinematograph according to the invention is shown diagrammatically in the accompanying drawings, Fig. 1 being a plan view, Fig. 2 a side elevation of a portion of the apparatus, Fig. 3 a partial axial section through the winding up reel with the brake mechanism and Fig. 4 a diagrammatic view of the starting mechanism.

As is seen in Fig. 1 the apparatus consists substantially of two kinematographic apparatus A, B, which are jointly driven from the middle shaft 1 by means of the bevel wheel gear 2, 3, 4 by the crank 5. The apparatus A projects the first part of the film, while the second apparatus B winds up the second part of the film in the reverse direction, thus preparing it for projection as the continuation of the record in apparatus A. In order that, after the one half film has been run off, the already unwound or newly wound up half of the film may not be torn off, on the crank 5 being further rotated, the automatic cinematograph is provided with the following braking mechanism: A metal cord 7 passes through the unwinding film reel of the apparatus A and the winding up film reel of the apparatus B or their hollow shafts 6, one end of which cord is attached to the last convolution of the metal strip 8 fixed to two film ends (Fig. 2), which strip, after being entirely unwound, pulls the metal cord 7. The length of this perforated metal strip 8 is such that, when its last convolution is still on the film reel, the strip shall still remain on the toothed guiding roller 9 or 10 and the pull of the metal cord 7 shall not be transmitted directly to the film and the latter may not be torn off. Behind the rollers 9 and 10 the film forms a loose loop 12 and 13 respectively.

In order that the loop 13 required during projection may be retained after the film has been wound from one reel to the other, the roller 13$^a$ is connected to the roller 12$^a$ by means of a small chain. The other end of the cord 7 is attached to a tension rod 14, which is adapted to slide in the shaft 6 (Fig. 3) and the movement of which is transmitted by means of a suitable arrangement 15, 16 to the band brake 17 of the fly-wheel 18 (Fig. 1). The fly-wheel 18 is driven by the gear 19, 20 from the shaft 1 of the crank 5. The crank 5 drives the shaft 1 of the automatic cinematograph by friction only, which is kept smaller than the resistance caused by the band brake 17, so that the observer, after the brake has been applied to the apparatus, when the film has come to an end, may not tear off the film by violently turning the crank 5 in the same direction.

In order that the time taken to exhibit the film may be reduced as far as possible and that time and lighting current may be thus saved and also so as to make it impossible for the observer to let the kinematographic apparatus run as slowly as he would like, a device is connected up in the circuit of the current of the projection lamps, which extinguishes the lamp of the apparatus in question immediately the number of revolutions of the crank shaft 1 falls below a certain fixed minimum.

The device consists of a centrifugal governor 21 on the shaft of the fly-wheel 18, which is arranged as one pole on a current cut-out for B in such a manner that the sleeve 22 is attached to a rod 23, which is journalled axially in the hollow shaft 18$^a$, one end of which rod forms one pole of the cut-out, which is connected to the pole 24 of the circuit of the projection lamps, on the governor 21 opening at a certain speed and thereby pushing out the rod 23. As soon as the number of revolutions of the governor 21 falls below a fixed minimum, its weights will drop and break the circuit.

Finally the automatic cinematograph is provided with a controlling device 25—26, 27, which releases the driving shaft 1 on a suitable coin being inserted in the coin chute 25a of the apparatus. The device is shown diagrammatically in Figure 4 and consists of a pivoted part 25 which projects into the coin chute, an oscillating pawl 26, and a cam 27, which is loosely mounted on the shaft 1. It will be noted in Figure 4 that the left hand end of the part 25 projects into the coin chute while its right hand end acts as an abutment for preventing movement of the pawl 26 in a counter clockwise direction. When a coin is inserted in the chute, it depresses the left end of the part 25 until said end strikes the retaining finger 25b which is integral with the pawl 26. At this time the right end of the part 25 will be raised out of contact with the pawl 26. The pawl 26 is operated from the exterior of the apparatus by a pointer (not shown), which may be turned to positions I and II. When it is turned to position I, the pawl will be moved to the position shown in dotted lines in Figure 4 and the finger 25b will be moved away from the part 25 so that the said part may tilt its full extent and permit the coin to drop from the end of the chute. The pawl 26 is integral with an arm 25c, which functions as a switch arm and cooperates with the stationary electric contacts I and II. The cam 27 is loosely mounted on the shaft 1 and it is provided with spring pawls 27a which engage the teeth of a ratchet 27b fixed on the shaft 1. By this construction the cam will revolve with the shaft 1 when said shaft is moved in a counter clockwise direction, but the shaft will move independently of the cam when said shaft is turned in a clockwise direction.

When the automatic cinematograph is to be put in operation a coin is inserted, which strikes the pivoted part 25 (Fig. 4). This causes it to sink and to release the pawl 26 by means of a change-over lever. The pawl 26 is thrown over to the left by hand, which closes the contact I, thus putting the lamp of the apparatus A in circuit (Fig. 1), at the same time releasing the cam 27. By turning the crank 5 in the counter clockwise direction, the film commences to be shown in the apparatus A, while the apparatus B at the same time winds up the second half of the film in the reverse direction. As soon as the rotation has acquired a certain speed, the governor closes the contacts 23, 24, the projection lamp being put in operation in the apparatus A and projecting the first half of the film. When this has come to an end, the second half has been wound up in the mean time in the apparatus B, and the braking action is applied to both projection apparatus, by the last convolution of the metal strip 8 at the end of the film pulling the cord 7 when unrolling which latter draws the rod 14 (Fig. 3) into the shaft 6, thus causing the band brake 17 (Fig. 1) of the fly-wheel 18 to be tightened. The current is thus interrupted by the governor and the projection lamp of the apparatus A extinguished.

The change-over mechanism 26 is thereupon placed by hand in the position II (that shown in full lines), by which means the projection lamp B is switched in and the pivoted part 25, from which the coins have previously fallen, returns to its original position. The shaft 1 is thereupon turned in the clockwise direction and, as in this direction the cam is free, its remains locked by the pawl 26. The manner of operation described is now repeated in the apparatus B, where the record is further exhibited, while in A the film is wound up in the reverse direction.

What we claim is:—

1. An automatic cinematograph comprising two similar stable kinematographic apparatus each having an unwinding reel and a winding up reel for the film in combination with means for interconnecting the kinematographic apparatus in such a manner that while one exhibits the record, the other winds up in the reverse direction the film containing the adjacent record and with means on the unwinding reel of the one apparatus and on the winding up reel of the other apparatus for braking the automatic cinematograph, which latter means prevent the films being torn, if the turning of the reels is continued, as set forth.

2. An automatic cinematograph as claimed in claim 1 in which each apparatus includes a window past which the film is fed, a feeding roller arranged at one side of said window, another feeding roller arranged at the opposite side of said window, and means connecting said rollers for joint movement whereby the forming of loops (12, 13), at opposite sides of the window, is ensured, whether the film is running in one direction or the other.

3. An automatic cinematograph as claimed in claim 1 in which the unwinding reel of one apparatus and the winding reel of the other apparatus each have a hollow shaft, a resilient strip arranged on said hollow shaft and having one of its ends connected to the shaft, the other end of said strip being provided with means for connecting the same to one end of a film, a tension rod slidably mounted in said hollow shaft, means connecting said tension rod to the free end of said strip, and means connected to said tension rod for effecting braking of the reels when said tension rod is moved in one direction by the free end of the strip moving outwardly as the last convolution of the film is unwound from the shaft.

4. An automatic cinematograph as claimed in claim 1, having a shaft common to the two apparatus, a crank for operating the said shaft and a frictional connection between the said shaft and crank, as set forth.

5. An automatic cinematograph as claimed in claim 1, having two projection lamps, a circuit supplying current to the lamps and a centrifugal governor connected up as a cut-out in the said circuit, as set forth.

6. An automatic cinematograph as claimed in claim 1, comprising two projection lamps, a circuit supplying current to the lamps and coin operated starting means acting as a change-over switch for the projection lamps, as set forth.

In testimony whereof we have signed our names to this specification.

VÁCLAV KRIEGERBECK.
JINDŘICH BAUTZ.

Witnesses:
JACOB KNOTT, Esq.
TUG S. MATHAUSERY.